(12) United States Patent
O'Leary et al.

(10) Patent No.: US 7,680,488 B2
(45) Date of Patent: Mar. 16, 2010

(54) APPARATUS FOR NOTIFICATION IN A CELLULAR COMMUNICATION SYSTEM

(75) Inventors: Anthony O'Leary, Cork (IE); Paul McCann, Cork (IE); Joseph M. O'Connor, Cork (IE)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/908,548

(22) PCT Filed: Mar. 27, 2006

(86) PCT No.: PCT/US2006/011143
§ 371 (c)(1),
(2), (4) Date: Sep. 13, 2007

(87) PCT Pub. No.: WO2006/118705
PCT Pub. Date: Nov. 9, 2006

(65) Prior Publication Data
US 2008/0146198 A1    Jun. 19, 2008

(30) Foreign Application Priority Data
Apr. 29, 2005   (GB)  ................... 0508792.9

(51) Int. Cl.
*H04M 1/725*   (2006.01)
*H04W 72/00*   (2009.01)
*H04B 7/00*    (2006.01)

(52) U.S. Cl. .............. 455/412.2; 455/450; 455/507; 455/419; 717/108

(58) Field of Classification Search ............ 455/412.2, 455/450, 507; 717/108
See application file for complete search history.

(56) References Cited

U.S. PATENT DOCUMENTS

| | | | |
|---|---|---|---|
| 6,343,216 B1 * | 1/2002 | Kim et al. | 455/450 |
| 6,624,752 B2 | 9/2003 | Klitsgaard et al. | |
| 6,816,720 B2 | 11/2004 | Hussain et al. | |
| 7,065,348 B1 * | 6/2006 | Aoki | 455/419 |
| 2006/0229090 A1 * | 10/2006 | LaDue | 455/507 |
| 2007/0245301 A1 * | 10/2007 | Schindler et al. | 717/108 |
| 2008/0146198 A1 * | 6/2008 | O'Leary et al. | 455/412.2 |

* cited by examiner

*Primary Examiner*—William D Cumming

(57) ABSTRACT

A notification apparatus 201 for a cellular communication system 100 comprises a call detector 209 which detects a communication initialization involving a first subscriber 101. A notification processor 211 determines if a communication notification requirement is stored for the first subscriber. If so, the notification processor proceeds to determine a second subscriber 115 associated with the first subscriber and the communication notification requirement. A notification message generator 215 then generates a notification message and transmits this to the second subscriber. The notification message comprises an indication of the communication initialization and may specifically be a text message indicating the nature of the communication and the involved parties.

8 Claims, 4 Drawing Sheets

APPARATUS FOR NOTIFICATION IN A CELLULAR COMMUNICATION SYSTEM

FIELD OF THE INVENTION

The invention relates to a method and apparatus for notification in a cellular communication system and in particular to notification of a communication initialisation to subscribers.

BACKGROUND OF THE INVENTION

In recent years, a plethora of new communication services has become available to the general consumer and this has led to a change in the communication behaviour and habits for many people. In particular the younger generation has quickly and enthusiastically adopted new means of communication and consequently the behaviour and interactions have changed substantially for especially this group of users.

For example, it has become common to interact with other users through mobile stations of cellular communication system using for example voice based or text based communications including for example messaging services such as text based messaging (e.g. a Short Messaging Service) or multimedia based messaging(e.g. a Multimedia Messaging Service).

A consequence of many of these new communication services and options is that it has become easier to get in touch with a larger group of people. Furthermore, in many communication services the identity of the communicating parties may be partially or fully anonymous. For example, anonymous web based chat applications have become extremely popular in many circles and have in particular become popular for the younger generations.

However, this has led to an increased anxiety and increased risk of vulnerable individuals coming into contact with undesirable characters and environments.

In particular, parents tend to have concerns about the consequences of the communication activities of their children. For example, many parents tend to have concerns about who their children is communicating with, and as the communication behaviour is shifting from the traditional human and local environment to an increasingly electronic and non-local environment, this concern has increased substantially as it becomes increasingly difficult to monitor and control and thus safeguard the children.

Accordingly, it would be advantageous if an improved communication environment could be provided and in particular a system for a cellular communication system allowing improved security, improved means of monitoring and controlling communication, low complexity and or improved performance and/or user service would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a notification apparatus for a cellular communication system, the apparatus comprising: detection means for detecting a communication initialisation of a communication involving a first subscriber; and notification means for determining if a communication notification requirement is set up for the first subscriber, and if so determining a second subscriber associated with the first subscriber and the communication notification requirement, and sending a notification message to the second subscriber, the notification message comprising an indication of the communication initialisation.

The invention may exploit the technical features of the cellular communication system to provide a notification to the second subscriber of the communication behaviour of the first subscriber. For example, a parent may be informed of calls made by or to a child. The system may allow improved monitoring and consequently control by one subscriber of the communications of another subscriber. An improved user service may be provided and in particular a safer electronic communication environment may be achieved.

The detection means and/or the notification means may for example be implemented in one or more processing elements. The first subscriber may be considered a first remote terminal or may e.g. be considered to correspond to a first subscriber identity in the cellular communication system. In particular, the first subscriber may equate to a remote terminal identity or an identity associated with the user of the remote terminal such as an identity (e.g. a phone number) of a Subscriber Identity Module. The subscribers may be any users of the cellular communication system. The term subscriber may be considered equivalent to a user.

The notification message may be sent using different communication services or even communication systems than the cellular communication system.

According to an optional feature of the invention, the detection means is arranged to detect a communication initialisation by the first subscriber.

The communication initialisation may be a communication setup such as an outgoing call initialised by the first subscriber. This may allow an efficient notification to a second subscriber of communications instigated by the first subscriber.

According to an optional feature of the invention, the detection means is arranged to detect a communication initialisation by a third subscriber for a communication involving the first subscriber.

The communication initialisation may be a communication setup initialised by another subscriber than the first subscriber. For example, the communication may be an incoming call for the first subscriber. This may allow an efficient notification to a second subscriber of communications instigated by another subscriber and involving the first subscriber.

According to an optional feature of the invention, the detection means is further arranged to determine a communication type of the communication and the notification means is arranged to send the second notification message in response to the communication type.

This may allow an improved user service and may in particular allow a graduated notification which varies for different communication types. For example, different notification messages may be sent for a data communication, a voice communication and a message communication. This may provide enhanced information of the communication behaviour and environment of the first subscriber.

According to an optional feature of the invention, the notification means is arranged to include an indication of the communication type in the notification message. This may allow an improved user service and may in particular provide enhanced information of the communication behaviour and environment of the first subscriber. For example, the notification messages may comprise information indicating whether the communication is a data communication, a voice communication and a message communication.

According to an optional feature of the invention, the notification means is arranged to only transmit a notification message for some communication types. This may allow an improved notification system and may in particular allow a notification system wherein the notification may be targeted to communication types of specific interest. This may allow an improved user experience and customised notification.

According to an optional feature of the invention, the notification apparatus further comprises means for determining a third subscriber involved in the communication and the notification means is arranged to transmit the notification message in response to the third subscriber.

This may allow an improved user service and may in particular allow a notification which takes into account other parties involved in the communication. For example, different notification messages may be sent depending on who else is involved in the communication. This may provide enhanced information of the communication behaviour and environment of the first subscriber.

According to an optional feature of the invention, the notification means is arranged to include an indication of the third subscriber in the notification message. This may allow an improved user service and may in particular provide enhanced information of the communication behaviour and environment of the first subscriber. For example, the notification messages may comprise information indicating which other parties are involved in the communication. The indication may for example be a subscriber identity of the third subscriber.

According to an optional feature of the invention, the notification means is arranged to only transmit a notification message for some third subscriber identities. This may allow an improved notification system and may in particular allow an improved user experience and customised notification. For example, the notification may be limited to communications involving undesirable or unknown other parties.

According to an optional feature of the invention, the notification message is a Short Message Service, SMS, message. This may provide a particularly advantageous notification message which is practical and user friendly and may facilitate adoption and implementation in many cellular communication systems. The SMS message may be an SMS message of a GSM or UMTS cellular communication system.

According to an optional feature of the invention, the communication is a user message communication.

The invention may allow a practical and advantageous notification system for message communications. The user message communication may be an incoming or outgoing message for the first subscriber, such as for example a text message (e.g. a Short Message Service, SMS, message) or an audiovisual message (e.g. a Multimedia Message Service, MMS, message).

According to an optional feature of the invention, the communication is an audio call. The invention may allow a practical and advantageous notification system for audio calls. The audio call may be an incoming or outgoing call for the first subscriber, such as for example a voice call such as a conventional phone call of a cellular communication system.

According to an optional feature of the invention, the communication is a data communication. The invention may allow a practical and advantageous notification system for data communications. The data communication may be an incoming and/or outgoing data communication for the first subscriber. The data communication may in particular be a data packet session and the communication initialisation may an initialisation of the data packet service such as the setting up of a packet data session.

According to an optional feature of the invention, the notification means is arranged to detect a communication termination of the communication and to transmit a second notification message in response to the detection of the communication termination. This may provide an improved notification and additional user information.

According to an optional feature of the invention, the notification means is arranged to include a location of the first subscriber in the notification message. This may provide an improved notification and additional user information. In particular, it may allow the second subscriber to coordinate the communication initialisation with the location of the first subscriber.

According to an optional feature of the invention, the notification apparatus is comprised in a fixed network of a cellular communication system. This may provide for efficient performance, facilitated implementation and/or improved backwards compatibility. For example, it may allow the notification system to be implemented without requiring any modifications to remote units of the cellular communication system.

According to an optional feature of the invention, the notification apparatus is comprised in a remote unit of the cellular communication system. This may provide for efficient performance, facilitated implementation and/or improved backwards compatibility. For example, it may allow the notification system to be implemented without requiring any modifications to the fixed network of the cellular communication system. E.g. the notification apparatus may be built into a remote unit of the first subscriber and may use conventional communication services of the cellular communication system to send the notification message to the remote terminal of the second subscriber.

According to a second aspect of the invention there is provided a notification method for a cellular communication system, the method comprising: detecting a communication initialisation of a communication involving a first subscriber; determining if a communication notification requirement is set up for the first subscriber, and if so: determining a second subscriber associated with the first subscriber and the communication notification requirement, and sending a notification message to the second subscriber, the notification message comprising an indication of the communication initialisation.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a UMTS (Universal Mobile Telecommunication System) cellular communication system but it will be appreciated that the invention is not limited to this application but may be applied to many other cellular communication systems including for example a GSM (Global System for Mobile communication system) cellular communication system.

Figure 1:
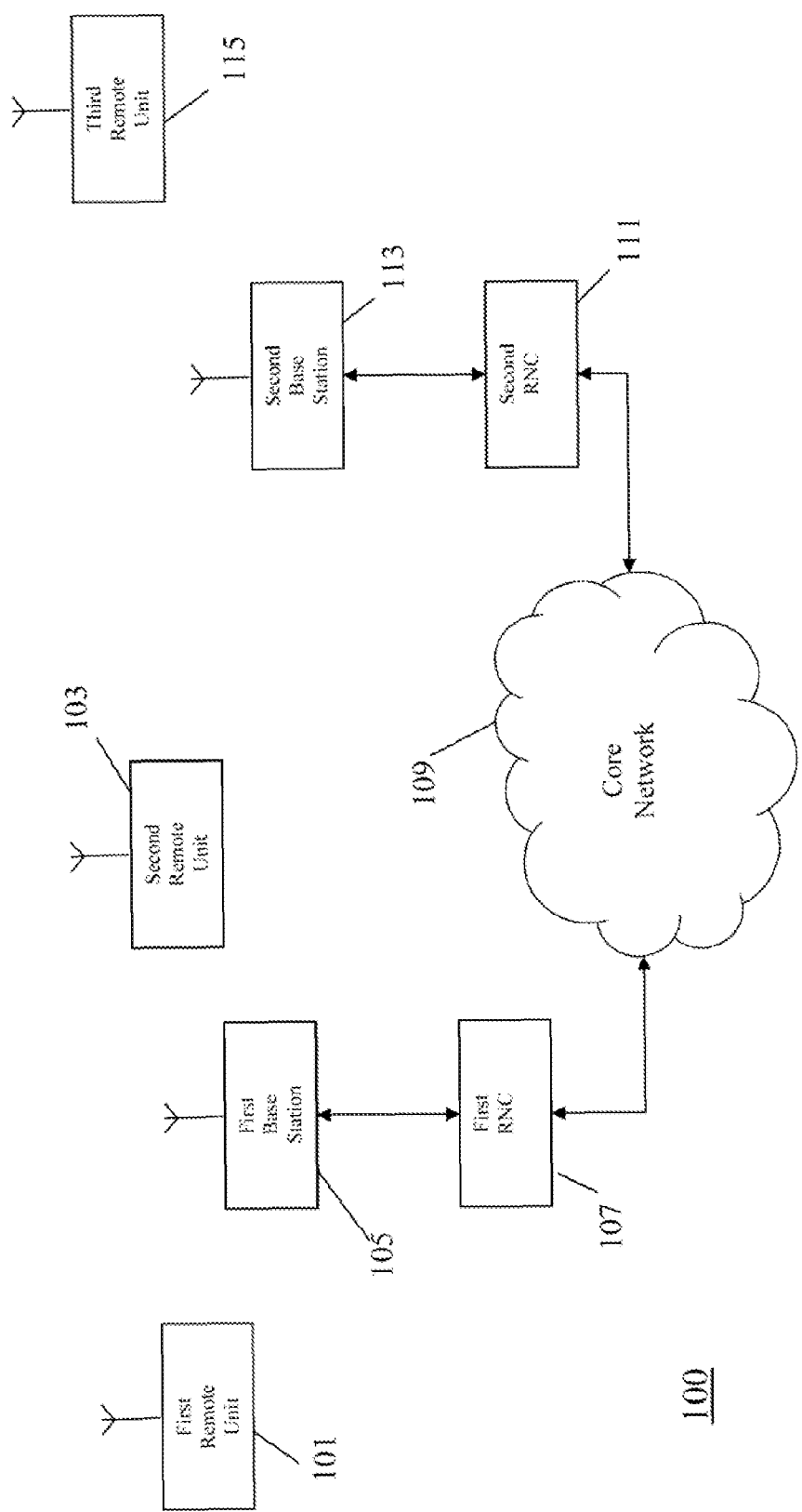
FIG. 1 illustrates an example of a cellular communication system in which embodiments of the invention may be employed.

FIG. 1 illustrates an example of a cellular communication system 100 in which embodiments of the invention may be employed.

In a cellular communication system, a geographical region is divided into a number of cells each of which is served by a base station. The base stations are interconnected by a fixed network which can communicate data between the base stations. A mobile station is served via a radio communication link by the base station of the cell within which the mobile station is situated.

As a mobile station moves, it may move from the coverage of one base station to the coverage of another, i.e. from one cell to another. As the mobile station moves towards a base station, it enters a region of overlapping coverage of two base stations and within this overlap region it changes to be supported by the new base station. As the mobile station moves further into the new cell, it continues to be supported by the new base station. This is known as a handover or handoff of a mobile station between cells.

A typical cellular communication system extends coverage over typically an entire country and comprises hundreds or even thousands of cells supporting thousands or even millions of mobile stations. Communication from a mobile station to a base station is known as uplink, and communication from a base station to a mobile station is known as downlink.

In the example of FIG. 1, a first remote unit 101 and a second remote unit 103 are in a first cell supported by a first base station 105. A remote unit may be for example a User Equipment (UE), a mobile station, a communication terminal, a personal digital assistant, a laptop computer, an embedded communication processor or any communication element communicating over the air interface of the cellular communication system.

The first base station 105 is coupled to a first RNC 107. An RNC performs many of the control functions related to the air interface including radio resource management and routing of data to and from appropriate base stations.

The first RNC 107 is coupled to a core network 109. A core network interconnects RNCs and is operable to route data between any two RNCs, thereby enabling a remote unit in a cell to communicate with a remote unit in any other cell. In addition, a core network comprises gateway functions for interconnecting to external networks such as the Public Switched Telephone Network (PSTN), thereby allowing mobile stations to communicate with landline telephones and other communication terminals connected by a landline. Furthermore, the core network comprises much of the functionality required for managing a conventional cellular communication network including functionality for routing data, admission control, resource allocation, subscriber billing, mobile station authentication etc.

The core network 109 is further coupled to a second RNC 111 which is coupled to a second base station 113. The second base station 113 supports a third remote unit 115.

In the specific example of FIG. 1, a communication is initialised between the first remote unit 101 and the second remote unit 103 and in response a notification apparatus generates a notification message which is transmitted to the third remote unit 115.

In the, following, exemplary embodiments wherein the notification apparatus is incorporated in an RNC will be described.

Figure 2:
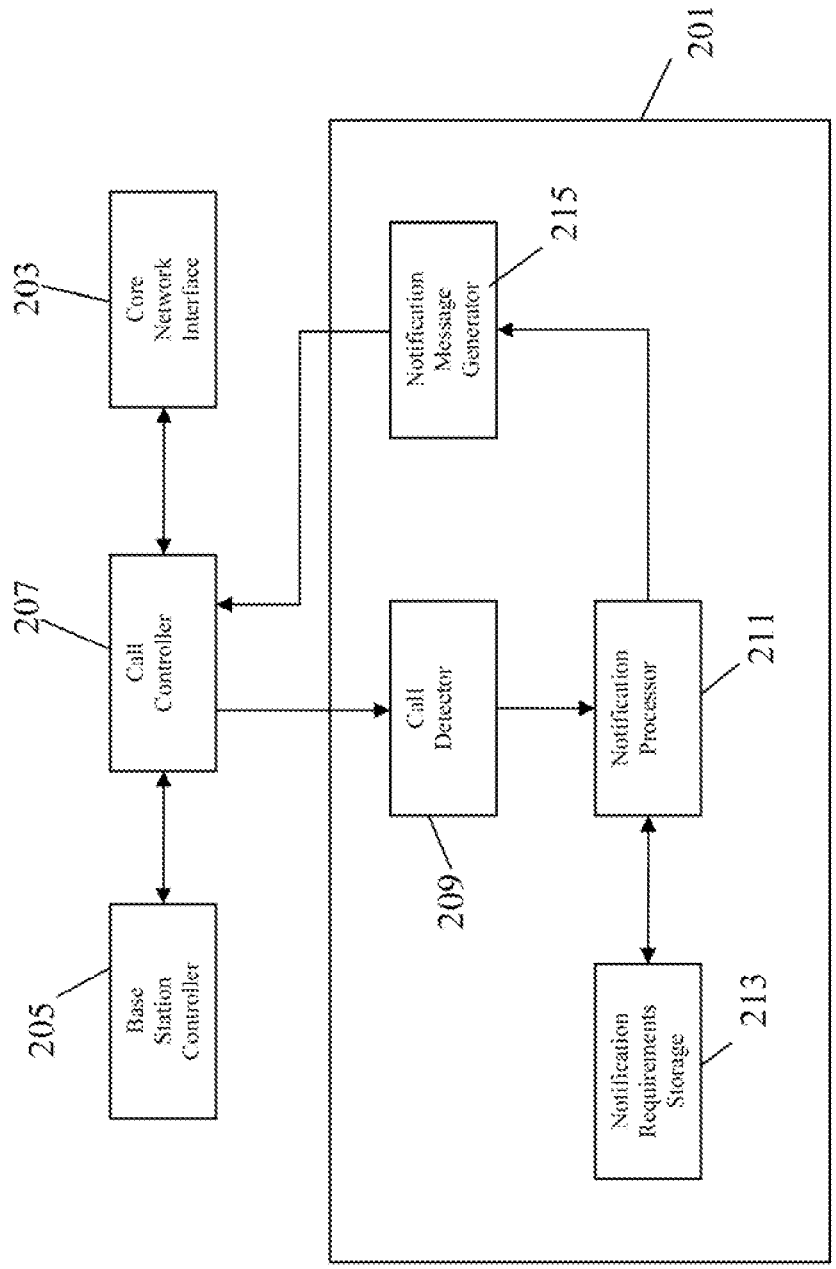
FIG. 2 illustrates an example of Radio Network Controller comprising a notification apparatus in accordance with some embodiments of the invention.

FIG. 2 illustrates an example wherein the first RNC 107 of FIG. 1 comprises a notification apparatus 201 which is arranged to generate a notification message.

In the example, the first RNC 107 comprises a core network interface 203 which provides interfacing to the core network 109 and a base station interface 205 which provides interfacing to the first base station 105. In addition, the first RNC 107 comprises a call controller 207 which is coupled to the core network interface 203 and the base station interface 205. The call controller 207 performs call control including resource management for all calls served by base stations coupled to the first RNC 107 as will be appreciated by the person skilled in the art.

The notification apparatus 201 comprises a call detector 209. The call controller 207 forwards information to the call detector 209 relating to the management and resource allocation for the base stations served by the first RNC 107.

When the call controller 207 is involved in setting up a new call for a remote unit of a base station attached to the first RNC 107, this is detected by the call detector 209 from the information provided by the call controller 207. For example, if the call controller 207 allocates a channel resource to a previously idle remote unit, this may be detected as a call setup. The call detector 209 further determines information related to the call setup. This information may specifically include information of the subscribers involved in the call being setup, the communication type, the base station involved in the call etc.

In some embodiments, the call controller 207 may directly inform the call detector 209 when a new call detector is set up. In this case, the call controller 207 may furthermore provide information relating to the call setup including for example the identity of the involved remote units and thus the subscribers involved.

The call being setup may for example be a call which is initiated by a remote unit served by a base station supported by the first RNC 107 or may be a call being set up by a remote unit supported through another RNC but involving a remote unit supported through the first RNC 107. In other words, the call may be an incoming or outgoing call for a remote unit served by a base station connected to the first RNC 107.

The call detector 209 is coupled to a notification processor 211. When the call detector 209 detects that a new call is being initialised, it provides information relating to the setup of the call to the notification processor 211. The notification processor 211 is further coupled to a notification requirements storage 213.

The notification requirements storage 213 comprises a list of subscribers for which a notification message must be generated. For each of the subscribers, the notification requirements storage 213 further comprises an indication of a subscriber to which the notification message should be sent. The notification requirements storage 213 may further comprise information indicating characteristics of the notification message to be sent, such as which communication channels should be used and/or what information should be included.

It will be appreciated that information may be entered into the notification requirements storage 213 by any suitable means and at any suitable time. For example, when a remote terminal attaches to a new base station served by a new RNC, the RNC sends a message to a Home Location Register (HLR) or Visitor Location Register (VLR). In response, the HLR or VLR may download information to the first RNC 107 of whether a notification must be sent for call setups for this remote unit, and this information may be stored in the notification requirements storage 213. The information may e.g. be manually entered into the HLR (and downloaded from the HLR to the VLR) by the operator of the cellular communication system.

In the specific example, the notification requirements storage 213 comprises an entry for the first remote unit 101 which indicates that a notification message must be sent to the third remote unit 115 when a call is setup for the first remote unit 101. Thus, whenever the call detector 209 detects a call setup involving the first remote unit 101, the notification processor 211 receives the information that the first remote unit 101 is involved in a call setup. In response, the notification processor 211 searches through the notification requirements storage 213 and identifies the entry for the first remote unit 101 and retrieves the information that a notification message must be sent to the third remote unit 115.

The notification processor 211 is coupled to a notification message generator 215. When the notification processor 211 determines that a notification message must be sent, it feeds the appropriate information to the notification message generator 215 and in particular provides the destination address to the notification message generator 215. In addition, the notification processor 211 may provide any other information related to the notification message to the notification message generator 215, such as information of the communication channel to use or what information to include.

Thus, in the specific example, when the notification processor 211 determines that there is a notification requirement set up for the first remote unit 101, it proceeds to provide an identification of the third remote unit 115 to the notification message generator 215. As a specific example, when a call is set up for the first remote unit 101 the phone number of the Subscriber Identity Module (SIM) for the first remote unit 101 may be compared to the phone numbers stored in the notification requirements storage 213. When detecting a match, the notification processor 211 retrieves the phone number of the SIM of the third remote unit 115 and feeds this to the notification message generator 215.

The notification message generator 215 proceeds to generate a notification message. The notification message is then fed to the call controller 207 which sends it to the appropriate destination. In the specific example of FIG. 2, the notification message generator 215 generates a text message, such as an SMS message, and addresses this to the third remote unit 115. The call controller 207 forwards the SMS message to the third remote unit 115 using the standard functionality for communicating SMS messages.

It will be appreciated that the notification message may comprise any suitable information. For example, in some low complexity embodiments, the notification message generator 215 may simply generate a standard message stating that a call is being initialised for the first remote unit 101.

However, in other more complex embodiments, the notification message may comprise further information relating to the call being set up. For example, the notification processor 211 may provide information to the notification message generator 215 of the second remote unit 103 involved in the call and the notification message generator 215 may include an indication of this in the notification message. As a specific example, the notification message generator 215 may include the phone number of the second remote unit 103 as a text string in the notification message. The notification message may for example also indicate whether the call is an incoming call or an outgoing call for the first remote unit 101.

The communication initialisation resulting in the notification message may be of different types. For example, a voice call may be set up and the notification message may be generated in response. As another example, a data call may be set up for the first remote unit 101 and this may be reported to the third remote unit 115. In particular, the call detector 209 may detect that a packet data session is being initialised and in response the notification apparatus 201 may transmit a notification message to the third remote unit 115. As yet another example, a message, such as an SMS message or a MMS message may be transmitted to or from the first remote unit 101 and this may be detected by the call detector 209 resulting in the generation of a notification message.

In some embodiments, the notification message generator 215 may be provided with information of which communication type the current initialisation relates to. For example, the notification message generator 215 may include a text string indicating whether the communication is a voice call, a data session or a message.

In some embodiments, the notification message generator 215 may furthermore include information indicative of the location of the first remote unit 101 and/or the second remote unit 103. In a low complexity embodiment, the notification message generator 215 may simply include an indication of the cell in which the first remote unit 101 is. This information is always available to the first RNC 107 and can thus easily be included.

However, in more complex embodiments, the location of the first remote unit 101 and/or the second remote unit 103 are determined with high accuracy using any known method for location determination in a cellular communication system. For example, the first remote unit 101 may simply comprise a Global Positioning System (GPS) receiver and may regularly update the first RNC 107 with this information.

Thus, the third remote unit 115 may be provided with very accurate information indicating the communication activity of the first remote unit 101. For example, if the first remote unit 101 is used by a child and the third remote unit 115 is used by a parent of the child, the parent may automatically be provided with information of who the child calls/is called by, the communication type and the location of the child and/or the other party when the call is set up.

In some embodiments, the call detector 209 may further determine when a communication is terminated. In response, the notification apparatus 201 may generate a second communication message indicating that the call has terminated. This second notification message may further comprise additional information such as for example a duration of the call. The second notification message is then sent to the third remote unit 115.

In some embodiments, only some communication set ups for the first remote unit 101 will be notified to the third remote unit 115. For example, the notification requirements storage 213 may comprise information that indicates specific characteristics that must be met before the communication being set up is notified to the third remote unit 115.

For example, the notification requirements storage 213 may comprise an indication for the first remote unit 101 that only voice calls should be notified and that consequently any messaging or data communications should not be notified. Accordingly, the notification processor 211 may compare the communication type of the communication being set up and may only instruct the notification message generator 215 if the communication type is a voice call.

As another example, the notification requirements storage 213 may comprise an indication for the first remote unit 101 that communications from or to specified subscribers need not be notified. Accordingly, the notification processor 211 may compare the second remote unit 103 to the list of remote unit identities stored in the notification requirements storage 213 and may only instruct the notification message generator 215 if no match is found. This may allow the users to set up a trusted community where, for example, a parent is not notified of calls involving other family members or explicitly identified friends or contacts.

Thus, a selective notification may be set up providing a more efficient and flexible notification service.

The example of FIG. 2 focussed on an implementation in the fixed network of the cellular communication system. An advantage of this approach is that the notification functionality may be centrally controlled and may be provided by the operator as a value added service thereby allowing increased revenue. Furthermore, the specific implementation does not necessitate any modifications to the remote units thereby facilitating roll out and backwards compatibility in many scenarios.

Figure 3:
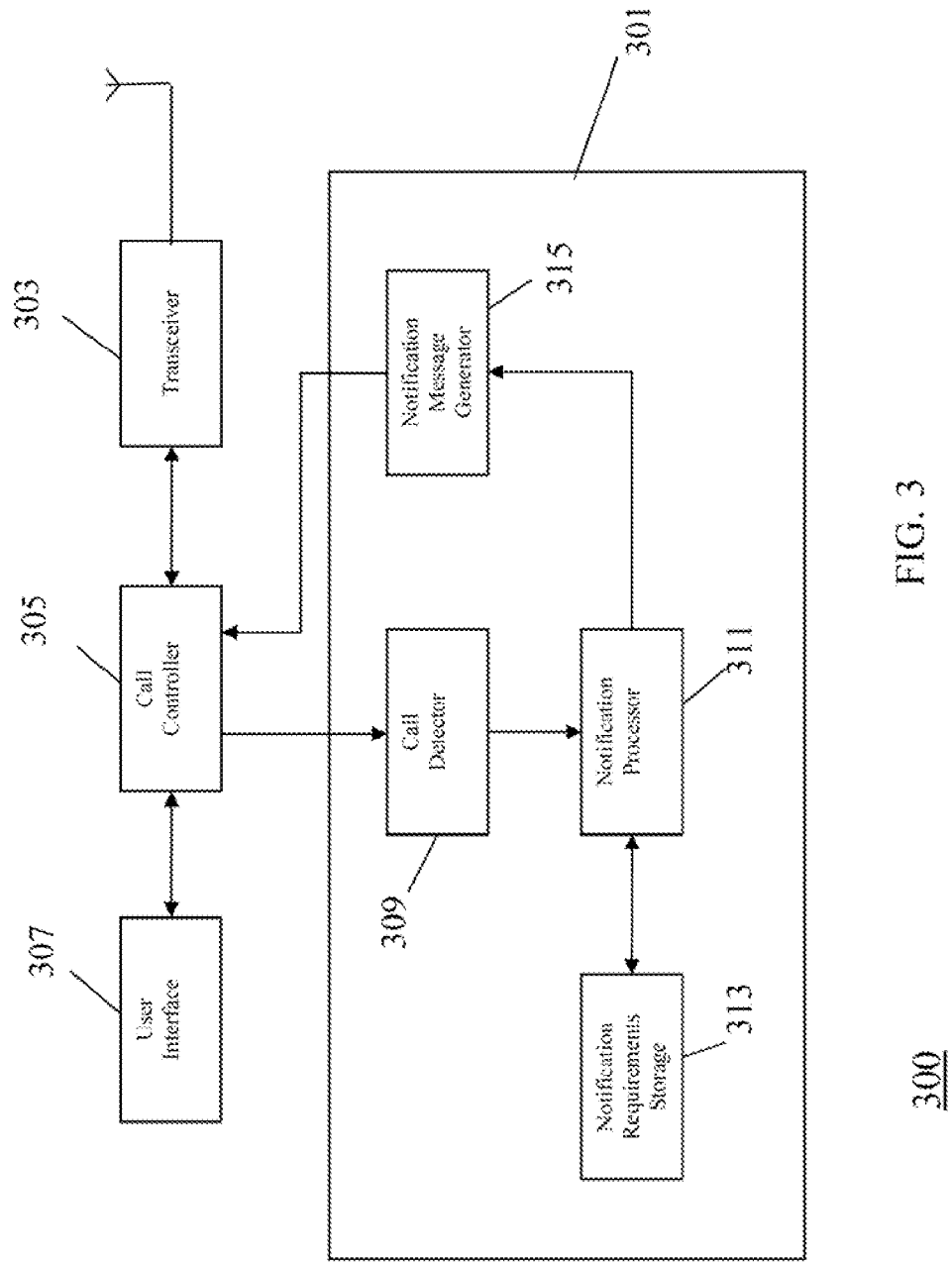
FIG. 3 illustrates an example of remote unit comprising a notification apparatus in accordance with some embodiments of the invention.

However, it will be appreciated that other distributions of the functionality of the notification apparatus may be employed. For example, FIG. 3 illustrates an example of a remote unit comprising a notification apparatus 301 in accordance with some embodiments of the invention. The remote unit may specifically be the first remote unit 101 of FIG. 1 and will be described with reference to this example.

The first remote unit 101 comprises a transceiver 303 which communicates with the first base station 105 over the air interface of the cellular communication system 100. The transceiver is coupled to a call controller 305 which controls the communication activity of the first remote unit 101. The call controller 305 is further coupled to a user interface 307 which may comprise a microphone, loudspeaker, keypad and display etc as will be known to the person skilled in the art.

The call controller 305 is coupled to a call detector 309 of the notification apparatus 301. The call detector 309 monitors the operation of the call controller 305 and detects if a new communication is being set up. In particular, the call detector 309 detects if an outgoing call is being established or if an incoming call is being received.

The call detector 309 is coupled to a notification processor 311 which is further coupled to a notification requirements storage 313 and a notification message generator 315. The notification requirements storage 313 comprises information indicating any criteria that must be met for a notification message to be generated and may also comprise information indicating what information should be included in such a notification message.

However, in contrast to the notification requirements storage 213 of FIG. 2, the notification requirements storage 313 need only comprise information relevant to the first remote unit 101. Indeed in some low complexity embodiments, the notification apparatus may not comprise any notification requirements but the first remote unit 101 may simply generate a notification message whenever a new incoming or outgoing call is detected. Thus, in some embodiments, any call detection is inherently for the first remote unit 101 and the notification requirement is inherently determined by a call detection. Similarly, the third remote unit 115 to which the notification message should be sent may be determined as a predetermined destination without requiring any further evaluation.

In the example of FIG. 3, when the call detector 309 detects a new call, it feeds the relevant information to the notification processor 311. The notification processor 311 proceeds to retrieve the required information from the notification requirements storage 313 and if the retrieved criteria are met for the current communication initialisation, it proceeds to instruct the notification message generator 315 to generate a notification message. Specifically, if the communication is of a specified type and does not involve a specified group of other remote units, the notification processor 311 instructs the notification message generator 315 to generate a notification message.

The notification message generator 315 is coupled to the call controller 305 and the notification message is fed to the call controller 305 which proceeds to transmit the notification message to the third remote unit 115. The notification message may for example be generated as an SMS message which is transmitted to the third remote unit 115 as a standard SMS message.

An implementation of the notification apparatus in the remote unit may be advantageous in many embodiments. For example, it may allow the individual subscriber to easily customise the operation for the individual preferences. It may furthermore reduce complexity in the fixed network and may in many scenarios provide facilitated deployment as no modifications to the fixed network are necessary.

It will be appreciated that although the previous description has focussed on embodiments wherein the notification apparatus is implemented in either an RNC or a remote unit, other distributions of functionality may be applicable and in particular that the functionality may be split between the remote unit and the fixed network. For example, the remote unit may comprise a call detector which transmits a message to a notification processor in the fixed network when a communication initialisation is detected and the notification processor may then determine if a notification message should be sent.

Figure 4:
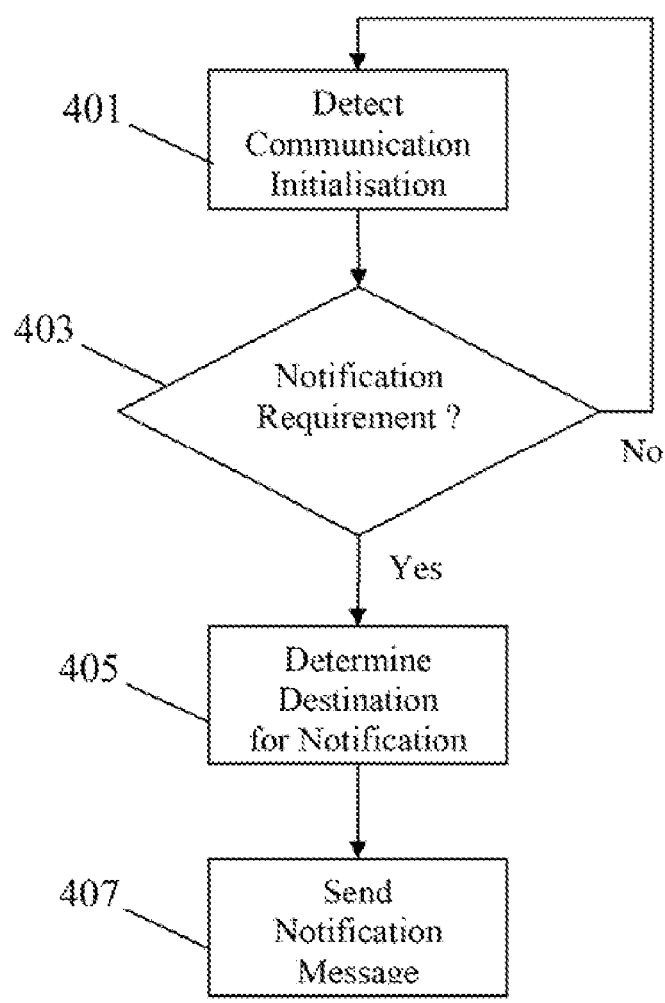
FIG. 4 illustrates a notification method for a cellular communication system in accordance with some embodiments of the invention.

FIG. 4 illustrates a notification method for a cellular communication system in accordance with some embodiments of the invention. The method may be applicable to the examples of FIGS. 1, 2 and 3.

The method initiates in step 401 wherein communication initialisation of a communication involving a first subscriber is detected.

Step 401 is followed by step 403 wherein it is determined if a communication notification requirement is set up for the first subscriber. If not, the method returns to step 401 and otherwise it proceeds to step 405 wherein a second subscriber associated with the first subscriber and the communication notification requirement is determined.

Step 405 is followed by step 407 wherein a notification message is sent to the second subscriber. The notification message comprises an indication of the communication initialisation and may specifically be a text message.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units.

As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

The invention claimed is:

1. A notification apparatus for a cellular communication system, the apparatus comprising:

detection means for detecting a communication initialization of a communication involving a first subscriber; and notification means for determining if a communication notification requirement is set up for the first subscriber, and if so determining a second subscriber associated with the first subscriber and the communication notification requirement, sending a notification message to the second subscriber, the notification message comprising an indication of the communication initialization, detect a communication termination of the communication, and transmitting a second notification message in response to the detection of the communication termination.

2. The notification apparatus of claim 1 wherein the detection means is arranged to detect a communication initialization by a third subscriber for a communication involving the first subscriber.

3. The notification apparatus of claim 1 wherein the detection means is further arranged to determine a communication type of the communication and wherein the notification means is arranged to send the second notification message in response to the communication type.

4. The notification apparatus of claim 3 wherein the notification means is arranged to include an indication of the communication type in the notification message dependent upon the communication type.

5. The notification apparatus of claim 1 further comprising means for determining a third subscriber involved in the communication and wherein the notification means is arranged to transmit the notification message in response to the third subscriber.

6. The notification apparatus of claim 5 wherein the notification means is arranged to include an indication of third subscriber in the notification message.

7. The notification apparatus of claim 5 wherein the notification means is arranged to only transmit a notification message for some third subscriber identities.

8. The notification apparatus of claim 1 wherein the notification means is arranged to include a location of the first subscriber in the notification message.

* * * * *